(12) United States Patent
Bossecker et al.

(10) Patent No.: US 7,040,651 B2
(45) Date of Patent: May 9, 2006

(54) SAFETY DEVICE FOR A VEHICLE OCCUPANT

(75) Inventors: Maximilian Bossecker, Hügelsheim (DE); Robert Getz, Ulm (DE); Ulrich Karlbauer, Ulm (DE)

(73) Assignee: Takata Corporation, Tokyo (JP)

( * ) Notice: Subject to any disclaimer, the term of this patent is extended or adjusted under 35 U.S.C. 154(b) by 215 days.

(21) Appl. No.: 10/637,642

(22) Filed: Aug. 11, 2003

(65) Prior Publication Data

US 2004/0113402 A1    Jun. 17, 2004

(30) Foreign Application Priority Data

Aug. 14, 2002   (DE) ................. 102 37 574

(51) Int. Cl.
*B60R 21/16*    (2006.01)

(52) U.S. Cl. ................. 280/730.1; 280/730.2; 280/743.1; 280/729; 297/216.12

(58) Field of Classification Search ............. 280/729, 280/730.1, 743.1, 743.2, 730.2; 297/216.12, 297/216.14
See application file for complete search history.

(56) References Cited

U.S. PATENT DOCUMENTS

| | | | | |
|---|---|---|---|---|
| 4,290,627 A | * | 9/1981 | Cumming et al. | 280/729 |
| 6,237,945 B1 | * | 5/2001 | Aboud et al. | 280/730.2 |
| 6,572,137 B1 | * | 6/2003 | Bossecker et al. | 280/730.1 |
| 2002/0014760 A1 | | 2/2002 | Bossecker et al. | |

FOREIGN PATENT DOCUMENTS

| | | |
|---|---|---|
| DE | 92 02 725 U1 | 9/1992 |
| DE | 43 20 147 A1 | 1/1994 |
| DE | 195 09 014 A1 | 9/1996 |
| DE | 198 59 988 A1 | 6/2000 |
| EP | 1 164 062 A1 | 2/2002 |
| JP | 10071915 A * | 3/1998 |

* cited by examiner

Primary Examiner—Ruth Ilan
(74) Attorney, Agent, or Firm—Foley & Lardner LLP (57) ABSTRACT

A vehicle occupant safety device for protecting the neck and nape area of an occupant of a vehicle. The device includes a main airbag for bending the head of the occupant, and at least one secondary airbag in fluid communication with the main airbag. The secondary airbag and the main airbag being connected to one another so that the second airbag fills with gas first. The secondary airbag being configured to fill with gas and deploy to position the main airbag before inflation of the main airbag occurs.

28 Claims, 8 Drawing Sheets

SAFETY DEVICE FOR A VEHICLE OCCUPANT

BACKGROUND

The invention relates to a safety device for a vehicle occupant.

A safety device of this kind for a vehicle occupant is disclosed in EP 1 164 062 A1 (incorporated by reference herein) and described therein especially in connection with FIG. 5 therein. This previously known safety device for a vehicle occupant has an airbag with two sections. One section of the airbag serves as a supporting section and the other section of the airbag serves as a holding section. The function of the supporting section consists in bringing the head restraint of the car seat into a raised position. The holding section of the airbag serves to bend the head or neck of the passenger forwardly.

SUMMARY OF THE INVENTION

According to an embodiment of the present invention, an airbag is provided. The airbag includes a main airbag and a secondary airbag. The main airbag guards the neck and nape. The secondary bag, which is passive as regards the "bending" function. The function of this secondary bag is to draw the main airbag, while in the still uninflated state, into the neck and nape area, i.e., into the area between the head restraint or upper portion of the car seat and the head and neck of the passenger, and to position it there before the inflation of the main airbag takes place. Since the main airbag is first brought into the neck and nape area of the passenger and is there completely "deployed" and positioned completely prior to inflation, it is assured that, in case of a subsequent inflation of the main airbag the pressure build-up in the passenger's neck and nape area takes place very uniformly and gently, because the pressure is exerted on the passenger uniformly over the entire outer surface of the main airbag. The main airbag covering the neck and nape area is first deployed and positioned prior to its inflation, in order to bring about a gentle build-up of pressure and produce a gentle precautionary action; this is achieved by the additional secondary bag pursuant to the invention, which does not have any "precautionary" function, but merely opens up and positions the—initially still substantially uninflated—main airbag.

In an exemplary embodiment of the present invention, the secondary airbag has two tubular positioning cushions which position the main airbag upon inflation. Preferably, the positioning cushions can deploy on the left and right past the passenger's head toward the roof of the vehicle. By arranging the positioning cushions next to the passenger's head it is assured that, when the secondary bag or positioning cushions are inflated, no unintended pressure build-up can occur in the passenger's neck-nape area, because the inflation is to be performed gently through the main airbag, as stated above.

To bring it about that the two positioning cushions will be in a defined position with respect to one another, it is considered advantageous if the two tubular positioning cushions are connected by a middle cushion which, upon inflation, will deploy in the area between the head restraint and the passenger's head. To ensure in that case that, when the secondary bag is inflated, no pressure will as yet be exerted on the passenger's neck-nape area, the thickness of the middle cushion is filled with gas, the passenger's head will be moved only negligibly forward in the direction of travel. The expression, "negligibly forward," is to be understood to mean a head movement of no more than about 15 cm in the direction of travel.

To prevent the positioning cushions from striking the roof of the vehicle when they are inflated, so that they cannot reach the desired position, it is considered advantageous if the positioning cushions are bent forward or forwardly inclined in the roof area; this is achieved in an advantageous manner by having in the positioning cushions two areas each, namely a lower area which in their inflated state is at least at the level of the passenger's neck and head area and reaches from the driver's seat toward the car roof, and an upper area which, at least in the inflated state, is above the passenger's head area and is angled forward in the travel direction with respect to the lower area.

If the two outer positioning cushions are connected in their lower portion by the middle cushion and in their upper portion by the upper portion of the main airbag, the assurance is obtained both of a defined position of the positioning cushions with respect to one another, and an especially reliable deployment and positioning of the main airbag in the passenger's neck-area.

Furthermore, it is considered advantageous if the length of the upper area of the positioning cushions is so as to provide coverage of the roof rail of the car, for if such is the length of the positioning cushions, a dual purpose of the positioning cushions is achieved: on the one hand the positioning cushions serve to position the main airbag, and on the other hand they serve to achieve lateral protection of the passenger from the roof rail of the vehicle.

Especially reliable protection of the passenger's neck-nape vertebrae is achieved especially when an unguarded collision of the passenger's head with the vehicle's roof is prevented—for example when the vehicle overturns. This can advantageously be achieved by designing the upper portion of the main airbag as a chute so that the passenger's head is guided along an established path during its movement toward the vehicle roof.

To assure a symmetrical filling of the main airbag, it is considered as advantageous if two connecting ports are provided between the main and secondary airbag. In order to assure the desired positioning of the main airbag by the two positioning cushions, it is considered advantageous if one connecting port is provided to connect the main airbag with one of the two positioning cushions, and another connecting port for connecting the main airbag with the other of the two positioning cushions.

To bring it about that the two positioning cushions also assure a lateral restraint of the passenger's head, it is considered advantageous if the two positioning cushions bulge in the direction of travel—in relation to the middle pad.

The secondary bag can be made very simply and at low cost if it is formed by two airbag layers of substantially mirror-image symmetrical shape, each disposed along a mirror image axis, which are joined together at their outer margin, and are subdivided into three portions by at least two strip-like seams holding together the two airbag layers, the middle portion of the middle cushion and the two outer portions form the positioning cushions, and the middle cushion and the two lower portions of the positioning cushions are disposed substantially parallel to the mirror image axis, while on the other hand the two upper areas of the positioning cushions are bent at a given angle perpendicular to the mirror image axis.

In order to achieve an optimum inclination between the lower and the upper area of the two positioning cushions, it is considered as advantageous if the given angle is approximately 45 degrees.

The two strip-like seams joining together the two airbag layers can be formed by an adhesive bond and/or by a seam, i.e., a hem. The same applies accordingly to the two airbag layers which can be stitched and/or bonded together at their outer margins.

To improve the stability of the middle cushion it is considered to be advantageous if central ducts are provided in the area of the middle pad; this can be accomplished advantageously by joining, especially by adhesive bonding and/or stitching, at least partially together the two airbag layers in proximity to the mirror image axis, to form two middle ducts in the middle pad.

To facilitate the deployment of the main airbag and the correct positioning of the main airbag, it is considered as advantageous if the middle ducts in the middle cushion taper conically toward the vehicle's roof, in order to smooth the transition between the middle cushion and the chute of the main airbag in this area.

The conical tapering together of the middle ducts can be advantageously achieved by making the margin of the two airbag layers taper together in the upper part of the middle cushion at least partially corrugated.

An especially simple and therefore more advantageous construction of the main airbag is achieved if the main airbag is formed by two additional airbag layers which are joined together at their outer margins, the main airbag is subdivided into a lower cushion area and an upper cushion area, the upper cushion area being divided into three tubular portions by two additional strip-like junction areas joining the two additional airbag layers, forming the chute of the main airbag.

The two additional strip-like joining areas can advantageously be formed by adhesive bonding and/or stitching; the same applies to the two additional airbag layers which are preferably bonded together and/or stitched together at their outer margins.

Furthermore, it is considered advantageous if the two inside margins of the upper area of the positioning cushion and the upper lateral margin of the main cushion, which extend away at the given angle, are joined together, especially by adhesively bonding and/or stitching, because in this embodiment of the junction between the positioning cushions and the principal cushion, the above-explained inclination of the positioning cushions above the passenger's head is secured.

To achieve sufficient stability in the main airbag, it is considered advantageous if two additional strip-like junction areas each lead in the upper cushion area of the main airbag into a circular or oval seam; in order then to assure that there will be no fixation of the passenger's head in an accident situation, it is considered advantageous if the circular or oval seams are covered by the middle cushion of the secondary airbag, so that fixation of the head is ruled out. This is advantageously achieved by the fact that the main airbag and the secondary bag are arranged with one another so that, when the, in the at least approximately inflated state of the main and secondary airbag, the tubular middle cushions of the secondary airbag are between the passenger's head and the two seams and they cover them with respect to the head. In an especially simple and thus advantageous manner, the shape of the lower cushion area of the main airbag can be established by a round seam—an oval seam, for example; the shape of the main airbag is important especially because the shape determines how greatly the passenger's head and neck are to be protected; it is therefore considered advantageous if the lower cushion area of the main airbag has a round seam, especially an oval seam, which establishes the thickness and the shape of the main airbag in consideration of the desired protection of the passenger's head and neck.

In order to prevent the airbag from catching around the head restraint of the occupant's seat as it inflates, it is considered advantageous if the airbag container, which keeps the airbag in the inactive state, is arranged such, or provided with a ramp—for example a sheet-metal piece—such, that when the airbag inflates it deploys forwardly at an angle in the direction of travel.

To achieve sufficient stability in the airbag even in the event of a roll-over of the vehicle, it is considered advantageous if the middle cushion of the secondary airbag is made stronger in its lower part which deploys substantially in the area between the head restraint and the upper end of the driver's seat than in the remaining part of the middle pad. A stronger construction of the middle cushion can be achieved especially by making the middle cushion thicker in the portion between the head restraint and the driver's seat than in the remainder of the middle pad.

Especially in the event of a roll-over it is important that the lateral position of the airbag must not vary; an especially secure lateral mounting of the airbag is advantageously achieved by fastening the secondary airbag to the airbag container or to the occupant's seat at least at two mounting points, one of which is at the bottom outer margin of one of the positioning cushions and the other on the lower outer margin of the other positioning pad.

A duct between the main and secondary airbags can be provided very simply, and thus advantageously, by bonding the main airbag and the secondary airbag together at their connecting ports, especially with a silicone adhesive. The bonding of the main and secondary airbags is then performed in such a way as to achieve great stability of shape in the resultant "combination airbag."

Furthermore, it is considered advantageous if the seams of the airbag are sealed with adhesive, especially with silicone adhesive; preferably, all seams should be sealed with silicone adhesive.

In the event of a rear-end collision at high speed it can happen that the back of the occupant's seat, the driver's seat for example, may fail mechanically and shift rearward. The occupant then also is shifted rearward and is exposed to the danger of suffering head injuries against the hard parts of the vehicle; in order then to assure sufficient protection of the occupant's head, the airbag, especially the chute of the main airbag, can be utilized. It is therefore considered advantageous if the occupant's safety device has a collision sensor in the rear part of the vehicle and a control system connected to this sensor which produces the inflation of the airbag even in case of a rear-end collision, if the collision sensor detects collision of a vehicle colliding from the rear at a velocity difference exceeding a given velocity difference limit. The term, "velocity difference," is understood to mean the difference in velocity between the vehicle being protected by the occupant safety device and the vehicle colliding from the rear.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1A:
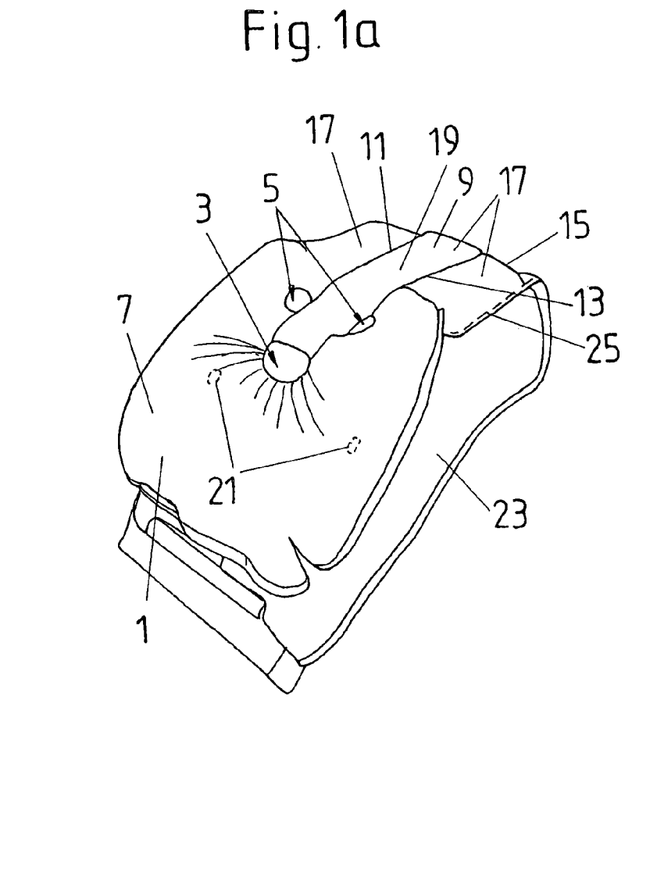
FIGS. 1a, 1b, 1c are perspective views of an embodiment for an airbag of the occupant safety device according to the invention.
Figures 1B, 1C:
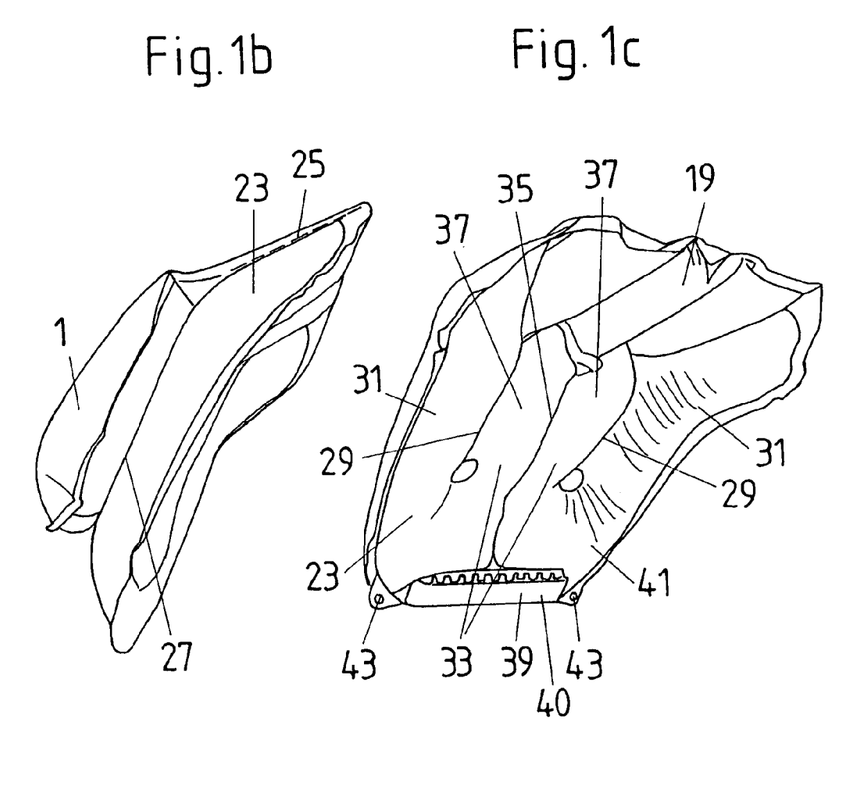

FIGS. 1a to 1c are three three dimensional views of an embodiment of an airbag in the vehicle occupant safety device according to the invention. In FIG. 1a there is seen a main airbag 1 which is divided by an oval seam 3 and by two circular seams 5 into a lower portion 7 and an upper portion 9. The two circular seams 5 form the ends of two approximately parallel seams 11 and 13 which extend each to the end of the upper portion 9 of the main airbag 1, and there lead into the outer main seam 15 of the main airbag 1.

By the two parallel seams 11 and 13, three tubular portions 17 are formed in the upper portion 9 and serve as a chute 19. The lower portion 7 of the main airbag 1 serves to protect the head and the neck of a vehicle occupant in the forward direction of travel.

Furthermore, two connection ports 21 are indicated in FIG. 1a, through which the main airbag 1 is in communication with a secondary airbag 23 in a flow-carrying connection. The main airbag and the secondary airbag are bonded to one another at the connecting ports 21.

Reference number 25 indicates a seam which attaches the main airbag 1 to the secondary airbag 23.

FIG. 1b shows an airbag in a side view. What is seen is the main airbag 1 which is bonded onto the secondary airbag 23 at the connecting ports at 27 and is sewn to it by the side seam 25.

FIG. 1c shows the secondary airbag 23 which is divided by two parallel seams 29, namely into two positioning cushions 31 and one middle cushion 33.

The middle cushion 33 is again divided by a long seam 35, which in appearance forms a kind of axis of symmetry or mirror image axis for the secondary airbag 23, into two tubular middle ducts 37 which run together upwardly, i.e., toward the chute 19 of the main cushion 1.

Furthermore, FIG. 1c shows a housing (or bag container) 39 in which the airbag 41 formed of the main airbag 1 and the secondary airbag 23 can be stowed in the folded state. A gas generator 40 for example, for inflating the airbag 41, can also be contained in the housing 39.

To fasten the airbag to a vehicle seat, fastening points 43 are provided at the bottom margin of the positioning cushions 31, and are at a great distance apart.

Figure 2:
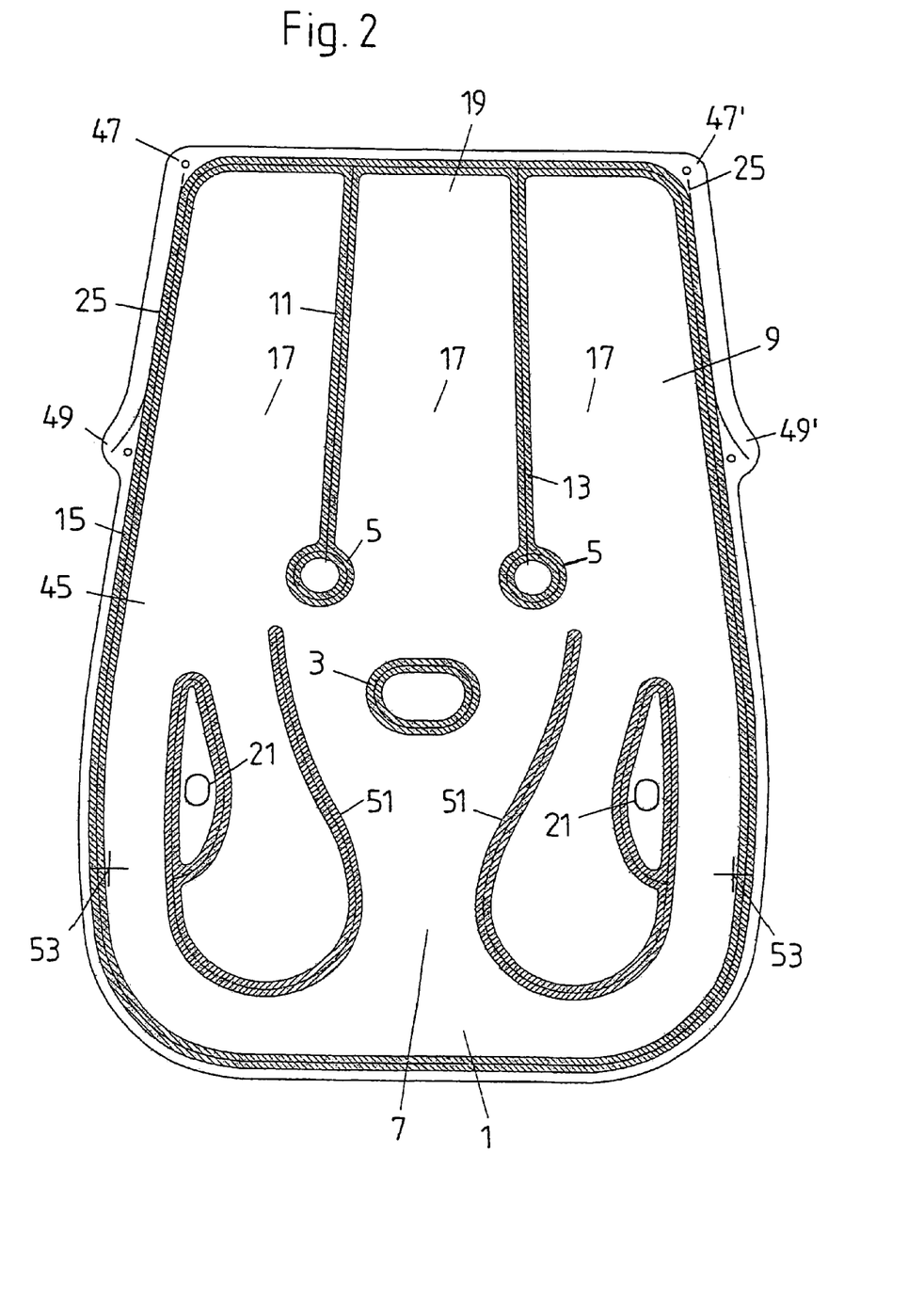
FIG. 2 is a cross-sectional view of the main bag of the airbag of FIGS. 1a to 1c.

FIG. 2 shows the construction of the main bag 1 of the airbag 41 in accord with FIGS. 1a to 1c. Two airbag layers 45 are seen, which are in the form of fabric panels 45; these fabric panels lie one on the other and are sewn together by the outside main seam 15.

Also seen in FIG. 2 is the oval seam 3 as well as the two circular seams 5 which divide the main airbag 1 into the lower cushion portion 7 and upper cushion portion 9. Furthermore, the two parallel seams 11 and 13 are shown which subdivide the upper cushion portion 9 into tubular portions 17. The tubular portions 17 form the chute 19 of the main airbag 1.

Also represented in FIG. 2 are the alignment points 47, 47', 49 and 49'. In the marginal area between the alignment points 47' and 49' the main airbag 1 is sewn to the outer margins of the positioning cushions of the secondary airbag 23.

FIG. 2 furthermore shows adhesion places 51 which are used for adhering the main airbag 1 to the secondary airbag 23 in the area of the connecting ports 21.

In FIG. 2, furthermore, positioning crosses 53 are represented, which show how the main airbag 1 is positioned relative to the secondary airbag 23: in FIG. 3, which is explained below, the corresponding positioning crosses on the secondary airbag 23 are shown.

Figure 3:
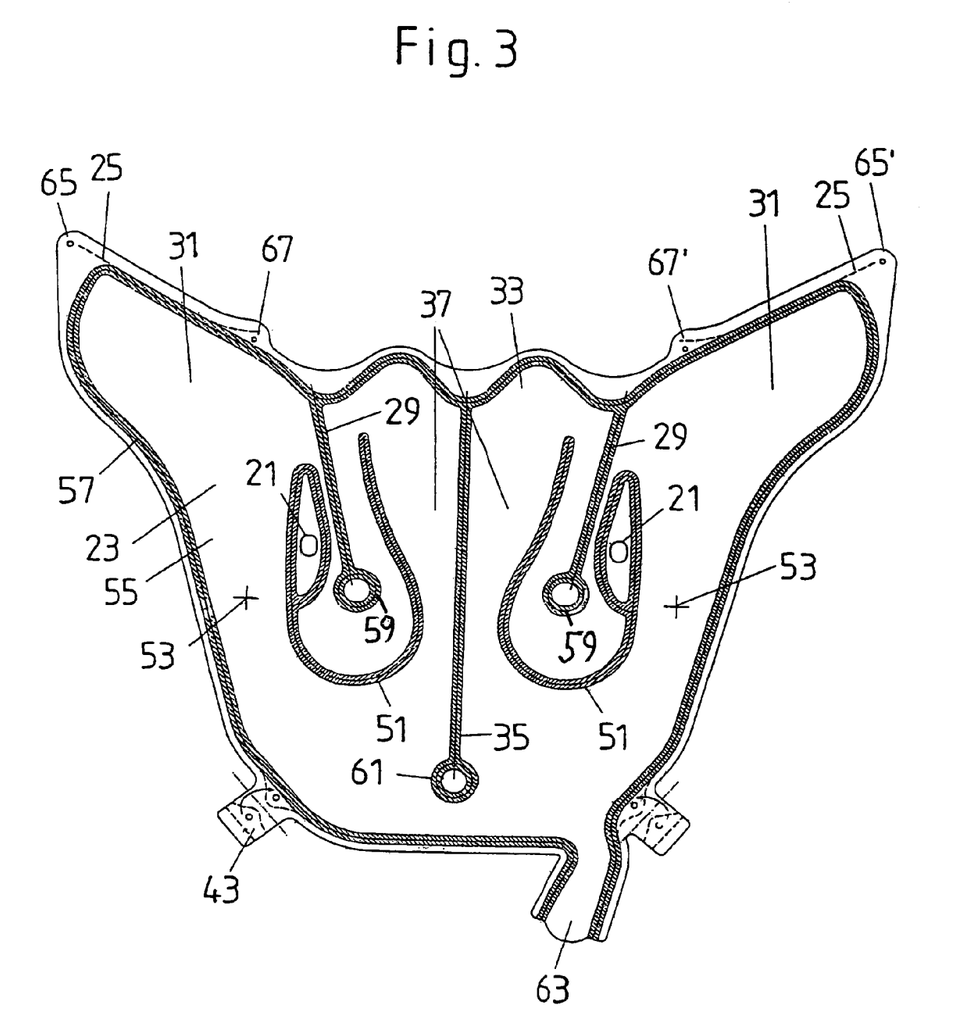
FIG. 3 is a cross-sectional view of the secondary airbag of FIGS. 1a to 1c.

FIG. 3 shows the construction of the secondary airbag 23 in detail. Two airbag layers 55 are shown, which are in the form of fabric panels 55. These fabric panels 55 lie one on the other and are sewn together by an external seam 57. Also seen are the parallel seams 29 which divide the secondary airbag into three portions, namely into the middle cushion 33 and the two positioning cushions 31. The two parallel seams 29 lead each into a circular seam which in FIG. 3 bears the reference number 59.

FIG. 3 furthermore shows the longitudinal seam 35 which forms a mirror-image axis or axis of symmetry of the secondary airbag 23 and leads into another circular seam 61. This longitudinal seam 35 divides the middle cushion 33 into the two central ducts 37.

In the upper portion of the secondary airbag 23— that is, the area opposite the gas inlet area 63— the fabric panels 55 are of a wave-like configuration; as a result, when the secondary airbag 23 is inflated, the two central ducts 37 of the secondary airbag 23 merge together conically.

As it can furthermore be seen in FIG. 3, the middle cushion 33 and the two lower portions of the two positioning cushions 31 are substantially parallel to the mirror-image axis formed by the longitudinal seam 35; the two upper portions of the positioning cushions 31, i.e., those which communicate with the wavy area of the middle cushion 33, are instead turned at an angle to the mirror-image axis. This angle amounts, in the embodiment in FIG. 3, to about 45°.

Alignment points 65, 67, 65' and 67' are indicated in FIG. 3, which define marginal areas of the fabric panel 55 of the secondary airbag 23. In the seam areas between the alignment points 65 and 67 and 65' and 67', the secondary airbag 23 is sewn to the main airbag 1 by the seam 25 (cf. FIGS. 1a, 1b, 2, 3, 4a and 4b). Concretely, the two airbags are sewn together such that the alignment point 47 of FIG. 2 coincides with the alignment point 65 in FIG. 3, the alignment point 49 in FIG. 2 with the alignment point 67 in FIG. 3, the alignment point 65' in FIG. 3 with the alignment point 47' in FIG. 2 and the alignment point 67' in FIG. 3 with the alignment point 49' in FIG. 2. It is possible to sew the two airbags at these points only because the fabric panels 55 of the secondary airbag 23 are, so to speak, turned upward in order to permit them to be joined to the seam 25 between the main airbag 1 and the secondary airbag 23 according to FIG. 2.

Also, FIG. 3 shows the fastening points 43 by which the airbag 1 is fastened in the vehicle occupant safety device.

Additionally, the glue joints 51 are marked, which serve to bond the secondary airbag 23 to the main airbag 1. Furthermore, the positioning crosses 53 are seen, which are intended to represent the position in which the fabric panels 45 of the main airbag 1 of FIG. 2 are to be fastened to the fabric panels 55 of the secondary airbag 23.

Figure 4A:
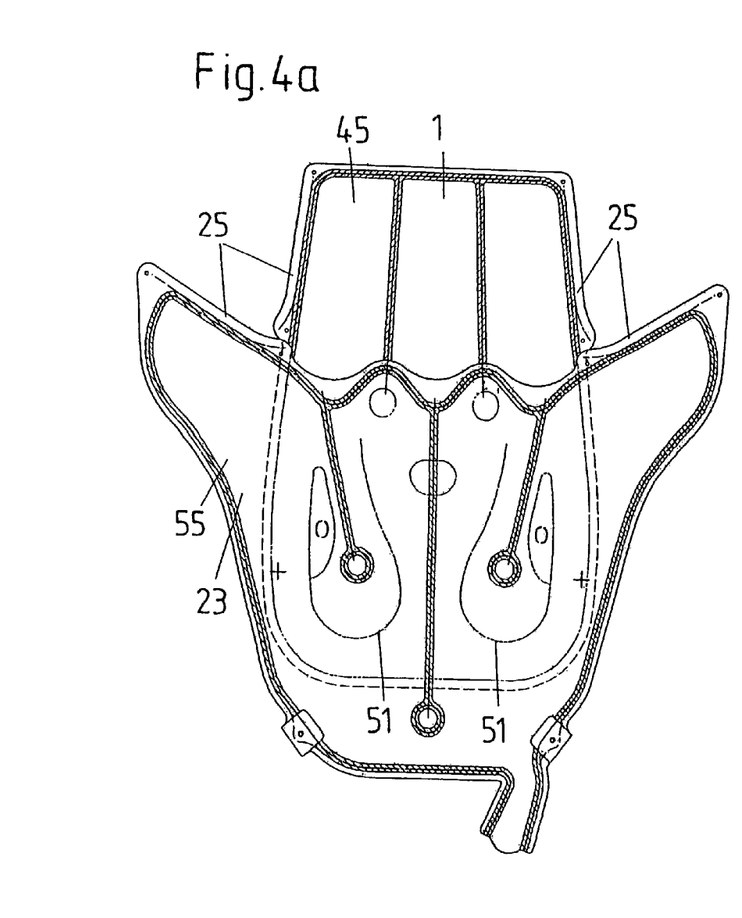
FIGS. 4a and 4b are cross-sectional views showing the connection between the main airbag and secondary airbag of the airbag in FIGS. 1a to 1c.
Figure 4B:
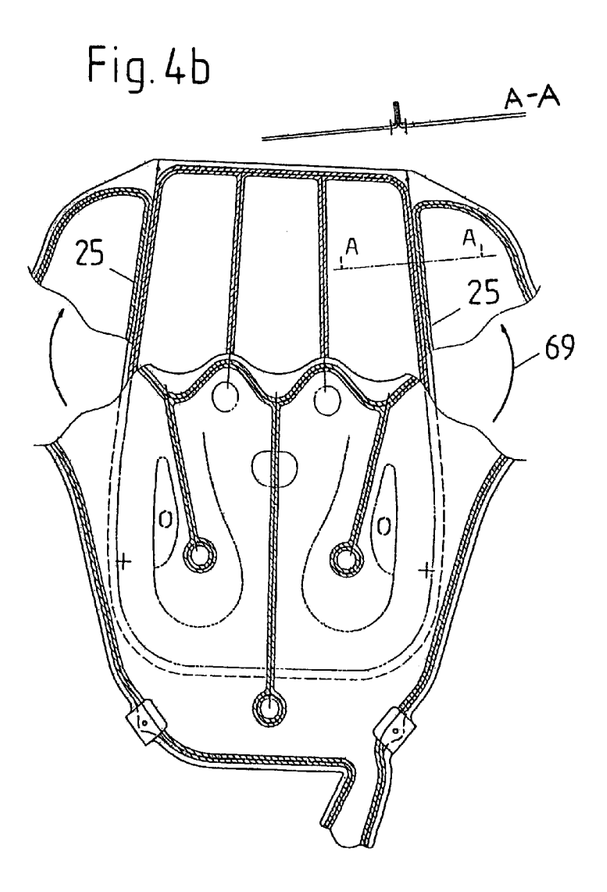

Lastly, FIGS. 4a and 4b show how the fabric panels 55 of the secondary airbag 23 are placed upon the fabric panels 45 of the main airbag 1 and are sewn after folding together the marginal areas. The folding together and sewing is indicated by the arrow 69 in FIG. 4b.

The fabric panels 45 of the secondary airbag 23 and the fabric panels 55 of the main airbag 1 are bonded together at the glue joints 51.

FIGS. 5a to 5h show the inflation in time of the airbag 41 according to FIGS. 1 to 4, namely, within a time window of 0 to 300 ms. The left image of each figure shows a side view and the right image a front view. FIGS. 5b to 5h then show the further course of the inflation.

In FIGS. 5a to 5h a car seat 100 is shown with a head restraint 110. A so-called dummy 120, substituting for a vehicle occupant, is seated on this car seat 100.

Figure 5A:
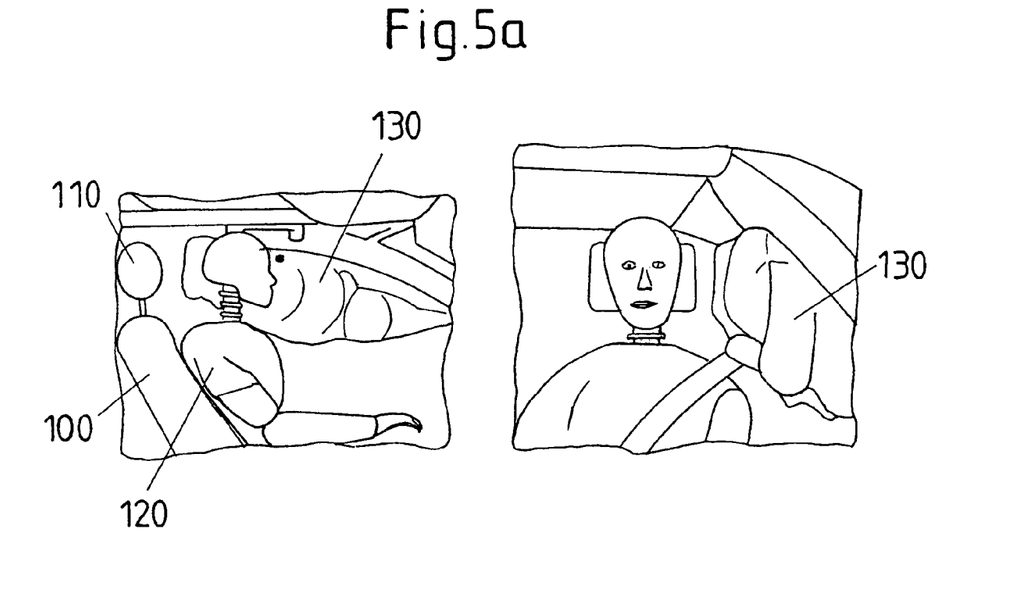
FIGS. 5a to 5h are perspective views of the interior of a vehicle showing the sequential inflation of the main and secondary airbags of FIGS. 1a to 1c.
Figure 5B:
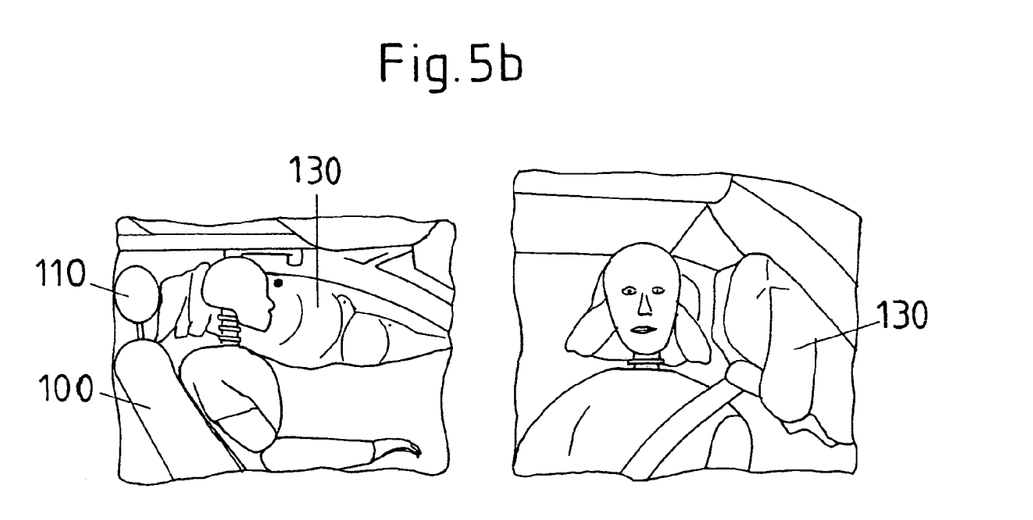
Figure 5C:
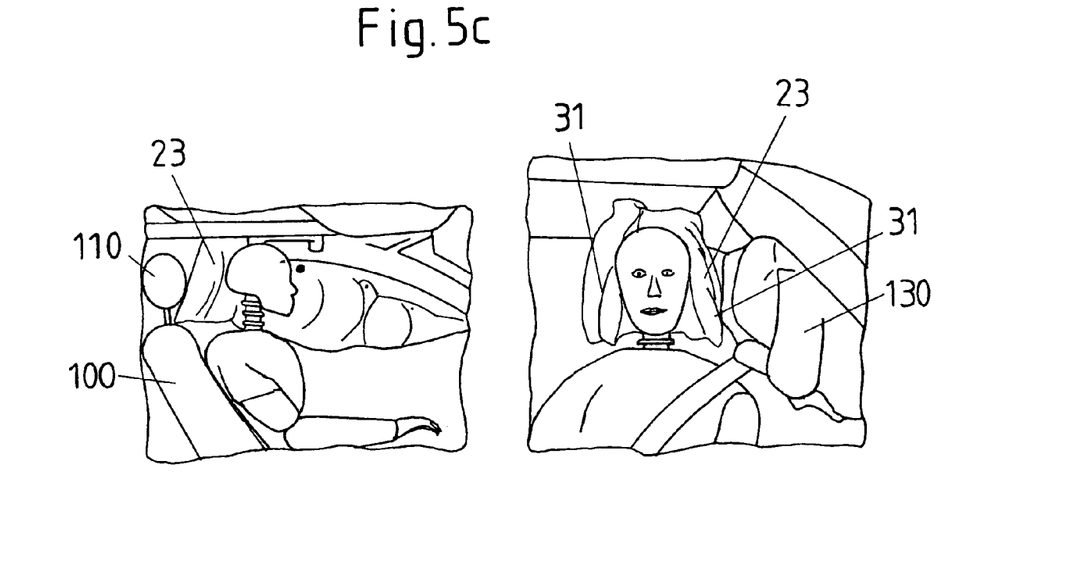
Figure 5D:
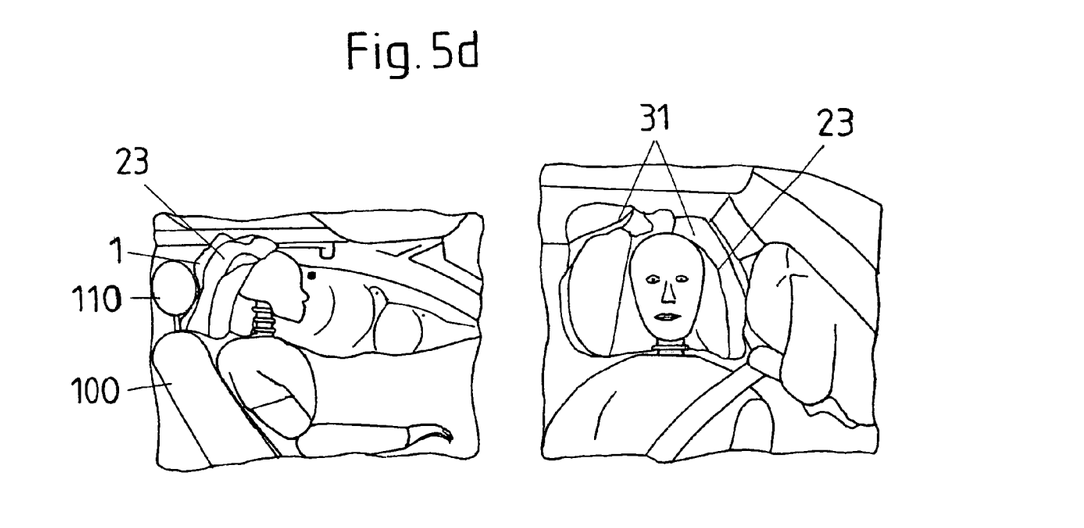
Figure 5E:
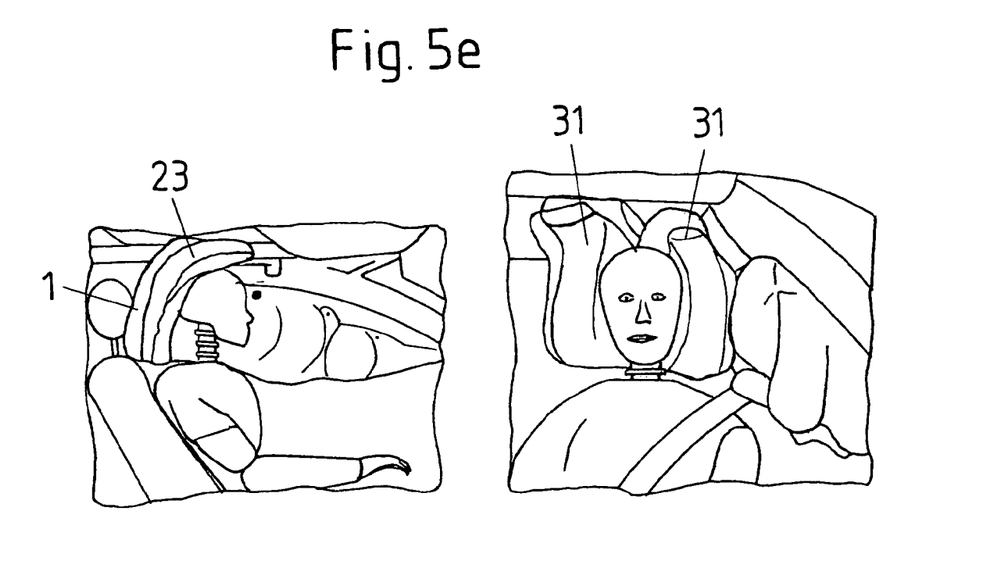
Figure 5F:
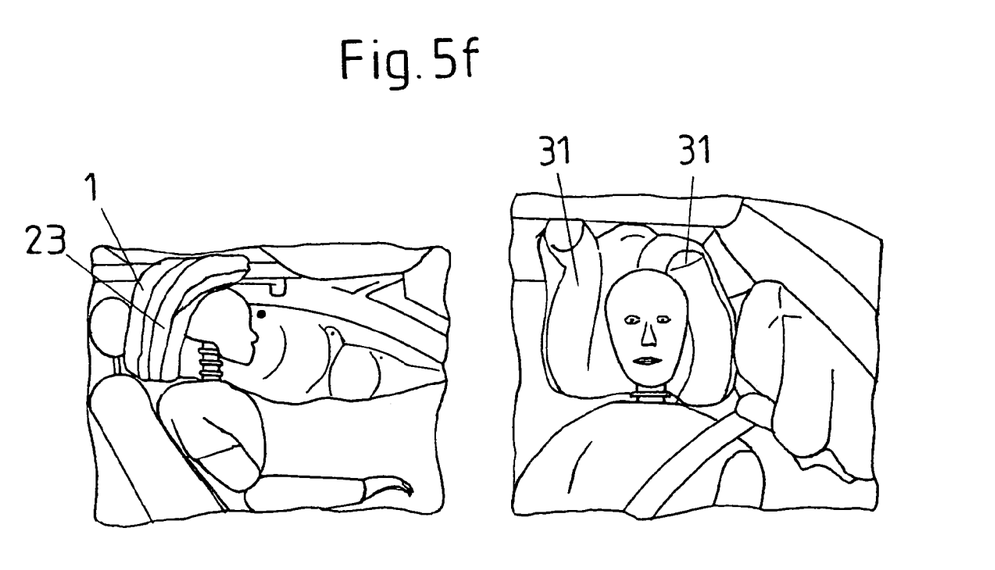
Figure 5G:
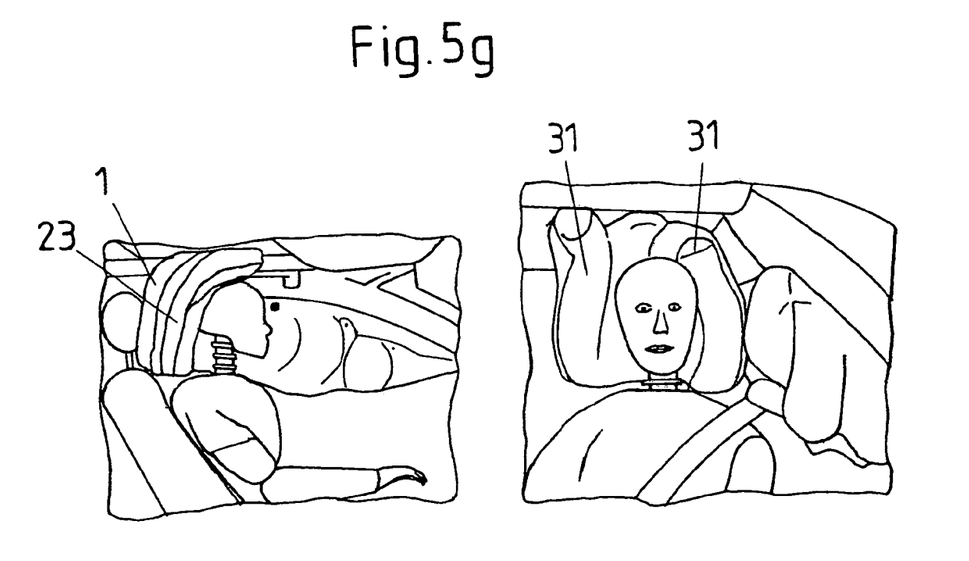

In FIG. 5a the airbag 41 is hardly to be seen; seen is only a side airbag 130 which is already completely inflated. This side airbag 130 plays an important part in the explanation of the vehicle occupant safety device and serves only to show that the occupant safety device of FIGS. 1 to 4 can be combined however desired with additional safety devices.

In FIGS. 5b to 5e it can be seen how the secondary airbag deploys and is inflated. Especially it can be seen how the positioning cushions 31 extend on the left and right beside the head of the dummy 120 toward the vehicle roof, and at the same time position the virtually entirely gas-free main airbag 1 between the head restraint 110 and the head of the dummy 120 (cf. especially FIG. 5d). Then the main airbag 1 fills with gas, as can be seen, for example, in FIG. 5e.

Figure 5H:
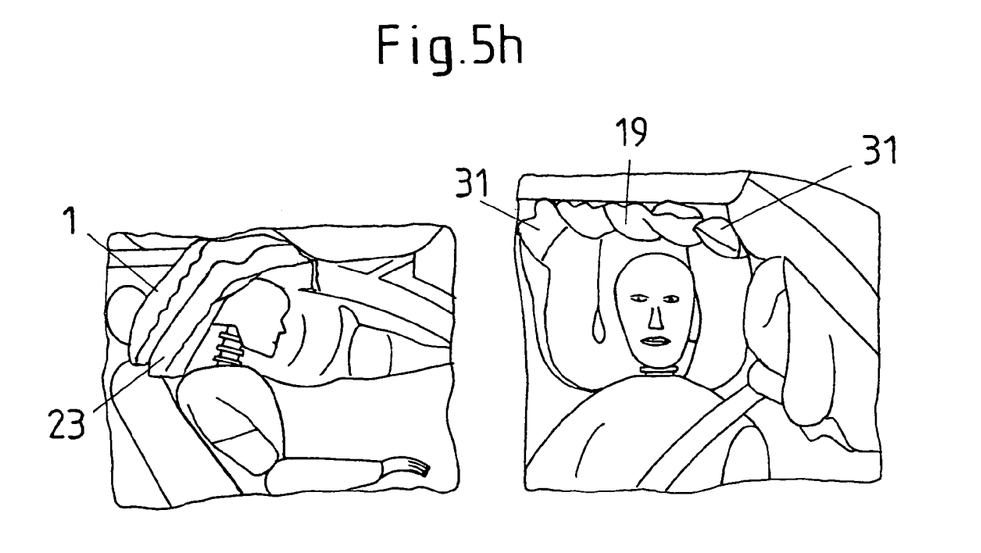

In FIG. 5h the airbag is then fully inflated. The positioning cushion 31 can be seen, between which the chute 19 of the main airbag 1 is disposed.

It can be seen furthermore from FIGS. 5a to 5h that—especially in the case of vehicle occupants of small body size—not only the upper portion of the main airbag can act as a chute, but also the lower portions of the main and secondary airbags. The lower portions of the main and secondary airbags are therefore to be of such dimensions that in association with the chute 19 of the main airbag they can act as an additional chute which adjoins the actual chute 19.

The priority application, German Patent Application No. DE 102 37 574.7 filed Aug. 14, 2002, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A safety device for an occupant sitting in a vehicle seat comprising:

an airbag positioned to deploy between the head of the occupant and a head restraint of the seat, wherein the airbag includes a main airbag in fluid communication with a secondary airbag;

wherein the secondary airbag is configured to substantially fill with inflation gas before the main airbag fills with inflation gas, and wherein the airbag is configured so that when the secondary airbag inflates the main bag is positioned between the head restraint and the neck and nape area of the occupant so that the main bag inflates to bend the head and the neck of the occupant toward the chest, wherein the secondary airbag has two tubular positioning cushions which are connected with the main airbag so that, upon inflation of the positioning cushions the positioning of the main airbag takes place, and wherein the two tubular positioning cushions are connected by a middle cushion which upon inflation deploys in the area between the head restraint and the occupant's head.

2. The device of claim 1, wherein the thickness of the middle cushion is so small that, when the secondary airbag fills with gas, the occupant's head is moved only slightly forward in the direction of forward travel of the vehicle.

3. The device of claim 1, wherein the middle cushion is configured to have a thickness after inflation that causes movement of the occupant's head no more than 15 cm in the direction of forward travel of the vehicle.

4. The device of claim 1, wherein the two positioning cushions are joined together in a lower portion by the middle cushion and in an upper portion by an upper portion of the main airbag.

5. The device of the claim 4, wherein a fluid connection between a main cushion and a secondary cushion is provided by two connecting ports.

6. The device of claim 5, wherein the two connecting ports connect the main airbag to the two positioning cushions.

7. The device of claim 1, wherein the secondary airbag comprises:

two substantially identical airbag layers, each layer having an axis of symmetry, wherein the two layers are joined together at an outer margin, and at least two strip-shaped connecting portions connecting the two airbag layers and subdividing the secondary airbag into three portions, wherein a middle portion forms the middle cushion and two outer portions form the positioning cushions, and wherein the secondary airbag is configured so that the middle cushion and two lower portions of the positioning cushions are arranged substantially parallel to a mirror-image axis, while two upper portions of the positioning cushions are turned at a given angle to the axis of symmetry.

8. The device of claim 7, wherein the given angle is approximately 45 degrees.

9. The device of claim 7, wherein the two strip-shaped connecting areas connecting the two airbag layers are each formed by a connecting seam.

10. The device of claim 7, wherein the two airbag layers are bonded together at outer edges.

11. The device of claim 7, wherein the two airbag layers are joined to one another at least partially near the axis of symmetry thereby forming two tubular middle ducts in the middle cushion.

12. The device of claim 11, wherein the middle ducts merge conically toward one another in an upper end area.

13. The device of claim 12, wherein the margin of the two airbag layers is at least partially of wavy shape in an upper portion of the middle cushion.

14. The device of claim 1, wherein the middle cushion of the secondary airbag is made stronger, substantially in the area deploying between the head restraint and an upper end of the occupant's seat, in comparison to the remaining area of the middle cushion.

15. A safety device for an occupant sitting in a vehicle seat comprising:
   an airbag positioned to deploy between the head of the occupant and a head restraint of the seat, wherein the airbag includes a main airbag in fluid communication with a secondary airbag;
   wherein the secondary airbag is configured to substantially fill with inflation gas before the main airbag fills with inflation gas, and wherein the airbag is configured so that when the secondary airbag inflates the main bag is positioned between the head restraint and the neck and nape area of the occupant so that the main bag inflates to bend the head and the neck of the occupant toward the chest,
   wherein the secondary airbag has two tubular positioning cushions which are connected with the main airbag so that, upon inflation of the positioning cushions the positioning of the main airbag takes place, and
   wherein each of the positioning cushions include a lower portion which at least when in an inflated state is disposed at the level of an occupant's neck and head area and extends from a driver's seat toward a vehicle roof, and an upper portion, which at least in the inflated state is disposed above the occupant's head area and is angled forward in the direction of travel with respect to the lower portion.

16. The device of claim 15, wherein the length of an upper portion of the positioning cushions is sufficient to shield the occupant from a roof rail of the vehicle.

17. The device of claim 15, wherein an upper portion of the main airbag is configured as a chute so that the passenger's head is guided along a path as the main airbag deploys toward the vehicle roof.

18. A safety device for an occupant sitting in a vehicle seat comprising:
   an airbag positioned to deploy between the head of the occupant and a head restraint of the seat, wherein the airbag includes a main airbag in fluid communication with a secondary airbag;
   wherein the secondary airbag is configured to substantially fill with inflation gas before the main airbag fills with inflation gas, and wherein the airbag is configured so that when the secondary airbag inflates the main bag is positioned between the head restraint and the neck and nape area of the occupant so that the main bag inflates to bend the head and the neck of the occupant toward the chest,
   wherein the secondary airbag has two tubular positioning cushions which are connected with the main airbag so that, upon inflation of the positioning cushions the positioning of the main airbag takes place, and
   wherein the two tubular positioning cushions are configured so that during inflation the cushions deploy laterally from the area of the vehicle seat on the left and right of the occupant's head toward a roof of the vehicle and draw the main airbag into a position between the head restraint and the occupant's head.

19. The device of claim 18, wherein the main airbag and the secondary airbag are connected together by adhesive.

20. The device of claim 19, further comprising a silicone adhesive for sealing the airbag.

21. The device of claim 18, wherein the safety device is configured to inflate the airbag in the event that the rear-end of the vehicle is collided with by a second vehicle having a velocity that exceeds the velocity of the vehicle by more than a predetermined amount.

22. A safety device for an occupant sitting in a vehicle seat comprising:
   an airbag positioned to deploy between the head of the occupant and a head restraint of the seat, wherein the airbag includes a main airbag in fluid communication with a secondary airbag;
   wherein the secondary airbag is configured to substantially fill with inflation gas before the main airbag fills with inflation gas, and wherein the airbag is configured so that when the secondary airbag inflates the main bag is positioned between the head restraint and the neck and nape area of the occupant so that the main bag inflates to bend the head and the neck of the occupant toward the chest,
   wherein the secondary airbag has two tubular positioning cushions which are connected with the main airbag so that, upon inflation of the positioning cushions the positioning of the main airbag takes place, and
   wherein the two positioning cushions are configured to expand further than a middle cushion in the direction of forward travel of the vehicle.

23. A safety device for an occupant sitting in a vehicle seat comprising:
   an airbag positioned to deploy between the head of the occupant and a head restraint of the seat, wherein the airbag includes a main airbag in fluid communication with a secondary airbag;
   wherein the secondary airbag is configured to substantially fill with inflation gas before the main airbag fills with inflation gas, and wherein the airbag is configured so that when the secondary airbag inflates the main bag is positioned between the head restraint and the neck and nape area of the occupant so that the main bag inflates to bend the head and the neck of the occupant toward the chest,
   wherein the secondary airbag has two tubular positioning cushions which are connected with the main airbag so that, upon inflation of the positioning cushions the positioning of the main airbag takes place, and
   wherein the secondary airbag is secured to the vehicle seat at two fastening points, wherein the fastening points are located at bottom outer margins of the positioning cushions.

24. A safety device for an occupant sitting in a vehicle seat comprising:
   an airbag positioned to deploy between the head of the occupant and a head restraint of the seat, wherein the airbag includes a main airbag in fluid communication with a secondary airbag;
   wherein the secondary airbag is configured to substantially fill with inflation gas before the main airbag fills with inflation gas, and wherein the airbag is configured so that when the secondary airbag inflates the main bag is positioned between the head restraint and the neck and nape area of the occupant so that the main bag inflates to bend the head and the neck of the occupant toward the chest,
   wherein the main airbag includes two airbag layers which are joined together at an outer margin and the main airbag is subdivided into a lower cushion portion and an upper cushion portion, the upper cushion portion being subdivided by two strip-shaped connecting portions joining together the two airbag layers and creating three tubular portions which form a chute of the main airbag, and wherein the two inside margins of the upper portion of the positioning cushions and the lateral upper margin of the main cushion are joined together by at least one of sewing and bonding.

25. The device of claim 24, wherein the two strip-shaped connecting portions are formed in each case by at least one of sewing and bonding.

26. The device of claim 24, wherein the two airbag layers are at least one of sewn and bonded together at their outer margin.

27. The device of claim 24, wherein the two strip-shaped connecting areas in an upper cushion portion of the main airbag lead each into a circular seam and the main airbag and the secondary airbag are disposed to one another so that, in an at least approximately inflated state of the main and secondary airbag, middle ducts of the secondary airbag are disposed between the passenger's head and two seams and shield the seams from the head.

28. The device of claim 24, wherein a lower cushion portion of the main airbag has a curved seam that determines the thickness and the shape of the main airbag with respect to acceptable bending of the occupant's neck and head.

* * * * *